United States Patent [19]

Rottmaier et al.

[11] 4,293,669

[45] Oct. 6, 1981

[54] HEAT-RESISTANT CROSS-LINKED POLYMERS AND THE USE THEREOF AS BINDERS

[75] Inventors: Ludwig Rottmaier, Odenthal; Rudolf Merten, Leverkusen; Jürgen Lewalter, Odenthal; Wilfried Zecher; Willi Dünwald, both of Leverkusen, all of Fed. Rep. of Germany

[73] Assignee: Bayer Aktiengesellschaft, Leverkusen, Fed. Rep. of Germany

[21] Appl. No.: 126,950

[22] Filed: Mar. 3, 1980

[30] Foreign Application Priority Data

Mar. 6, 1979 [DE] Fed. Rep. of Germany ....... 2908626

[51] Int. Cl.³ ..................... C08G 18/32; C08G 18/38; C08G 18/16
[52] U.S. Cl. ................................. 525/452; 525/437; 528/60; 528/73; 528/55; 528/54; 528/56
[58] Field of Search ............... 525/437, 452, 424, 440; 528/60, 73

[56] References Cited

U.S. PATENT DOCUMENTS

| | | | |
|---|---|---|---|
| 3,573,301 | 3/1971 | Winter | 528/73 |
| 3,763,269 | 10/1973 | Formaini | 528/67 |
| 4,031,040 | 6/1977 | Den Otter et al. | 528/67 |
| 4,066,437 | 1/1978 | von Bredow et al. | 424/272 |
| 4,110,318 | 8/1978 | Giesecke et al. | 528/73 |

FOREIGN PATENT DOCUMENTS 2156972  1/1973  France.

*Primary Examiner*—H. S. Cockeram
*Attorney, Agent, or Firm*—Connolly and Hutz

[57] ABSTRACT

Heat resistant polymers connected by ester and/or urethane groups and optionally amide- and/or imide groups and/or hydantoin and/or isocyanurate rings are obtained by crosslinking the polymers with trishydroxy alkyl triazolidine -3,5-diones.

5 Claims, No Drawings

HEAT-RESISTANT CROSS-LINKED POLYMERS AND THE USE THEREOF AS BINDERS

The materials used for the production of coatings and films in the electrical insulation field are required to have a high electrical insulation capacity and, increasingly, a high resistance to heat.

For this reason, the known polyesters, such as terephthalic acid polyesters (Belgian Pat. No. 557,685), have meanwhile been subjected to numerous modifications. The mechanical and thermal properties thereof, inter alia, are varied by the incorporation of, for example, imide and/or hydantoin groups. In many cases, the processes used may only be carried out with considerable technical outlay. A more simple method of increasing heat resistance (softening temperature) is to incorporate tris-functional alcohols, such as trimethylol propane or glycerol. The incorporation of these tris-functional alcohols may give rise to a reduction in the elasticity of the lacquers so that there is a need to find a compromise between increased softening temperatures and adequate elasticity.

A further improvement in the thermal properties may be obtained by the incorporation of isocyanurate structures by means of isocyanurate polyisocyanates (German Auslegeschrift DAS No. 1,179,319) and by using cyanuric acid aryl esters and polyols (DAS No. 1,096,031), followed by conversion into isocyanuric acid esters. Unfortunately, the polymers obtained are fairly difficult to dissolve. The polymers are soluble almost exclusively in solvents such as phenol, cresols or xylenols. However, the use of such solvents generally involves serious problems of pollution.

Accordingly, an object of the present invention is to obviate the above-mentioned disadvantages of known polymers of the type generally used for the known polymers of the type generally used for the production of coatings and films in the electrical insulation field and, in addition, to provide polymers which show increased heat resistance besides good mechanical properties and which, in addition, are soluble in solvents which are less harmless to the environment.

It has now surprisingly been found that the incorporation of N,N',N''-tris-hydroxyalkyl triazolidine-3,5-diones into polymers connected through ester and/or urethane groups and, optionally, amide and/or imide groups and/or isocyanurate and/or hydantoin rings increases the resistance to heat without affecting the mechanical properties. This is all the more surprising insofar as the hydrazine structure N-N is thermally unstable, so that the N,N',N''-tris-hydroxyalkyl triazolidine-3,5-diones had been expected to be degraded under thermal stressing. In addition, the incorporation of N,N',N''-tris-hydroxyalkyl triazolidine diones into the polymers according to the present invention improves the solubility thereof, so that there is little or no need to use the conventional and, in some cases, highly toxic solvents, such as phenol, cresols and xylenols.

Accordingly, the present invention relates to cross-linked polymers which are connected by ester and/or urethane groups and which optionally contain co-condensed amide and/or imide groups and/or isocyanurate and/or hydantoin rings or are mixed with the corresponding polymers, characterised in that the cross-linking component is derived from N,N',N''-tris-hydroxyalkyl triazolidine-3,5-diones corresponding to the following general formula:

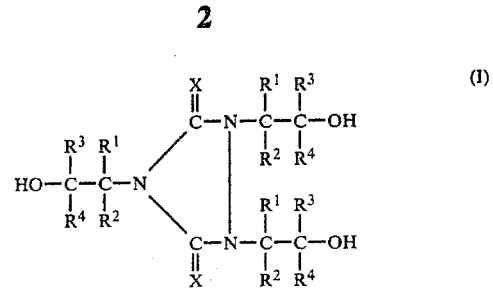

wherein the radicals $R^1$, $R^2$, $R^3$ and $R^4$, which may be the same or different, each independently represents a hydrogen atom, an optionally halogen-substituted $C_1-C_{10}$ alkyl radical, $C_4-C_8$ cycloalkyl radical, $C_7-C_{17}$ aralkyl radical or a $C_6-C_{16}$ aryl radical optionally substituted by halogen atom $C_1-C_6$ alkyl and/or $C_1-C_6$ alkoxy and X is O or S.

The present invention also relates to the use of these polymers or polymer mixtures for producing heat-resistance coatings, films, adhesives and mouldings. The properties may be varied within wide limits according to the particular application by the addition of fillers, pigments, low molecular weight and high molecular weight inventive polymers.

The triols corresponding to above general formula (I) used in accordance with the present invention are obtained by reacting triazolidine-3,5-dione (=uracol) with alkylene oxides, preferably ethylene oxide, propylene oxide, butylene oxide, styrene oxide, optionally in the presence of a suitable catalyst. However, it is also possible to use the thio analogue or uracol. The addition of the alkylene oxide to the three NH-groups of the triazolidine-3,5-dione may be carried out in the presence of both acidic and alkaline catalysts. However, the triols corresponding to above general formula (I) are preferably produced in the presence of basic catalysts, such as tetraethyl ammonium chloride, tertiary amines, such as triethylamine and dimethylaniline, and alkali metal or alkaline earth metal hydroxides or carbonates, such as calcium hydroxide or potassium carbonate. However, it is also possible to use alkali metal halides, such as lithium chloride. The catalyst may be used in a quantity of from 0.05 to 3%, based on the reactants.

In one preferred embodiment, three moles of ethylene oxide are added to one mole of uracol in the absence of a catalyst, resulting in the substantially quantitative formation of N,N',N''-tris-hydroxyethyl uracol.

The tris-hydroxy compounds corresponding to above general formula (I) are preferably produced using equivalent quantities, i.e. three moles of alkylene oxide are used per mole of uracol. An excess or deficit of the alkylene oxide is possible.

The reaction of the uracol with the alkylene oxide is preferably carried out in inert organic solvents. Particularly suitable solvents are polar organic solvents, such as dimethyl sulphoxide, tetramethylene sulphone, dimethyl formamide, dimethylacetamide and N-methyl-2-pyrrolidone. Another particularly suitable solvent is water. It is not absolutely essential to react the uracol in solution with the alkylene oxide. The reaction may also be carried out using a uracol suspension, in which case the triol formed passes into a solution so that the end of the reaction is indicated by the formation of a clear solution. Uracol and alkylene oxide may also be added together to the triol solution formed so that the amount of solvent used is very small. For economic reasons, the amount of solvent used should be very small and may amount to from 0.3 to 20 parts, by weight, per part, by weight, of reactants. On completion of the reaction, the solvent may be removed by applying a vacuum and the viscous residue left may be purified by working-up in the conventional way, for example by recrystallisation. In many cases, however, there is no need for purification, i.e. the crude product may be further processed immediately.

The cross-linking component is preferably produced at temperatures of from 25° to 200° C., with particular preference, from 80° to 150° C. The reaction times are generally from 30 minutes to several days, although in certain cases they may be longer or shorter. By suitably adjusting the reaction conditions, for example pressure, it is possible to obtain shorter reaction times.

In above general formula (I), $R^1$, $R^2$, $R^3$ and $R^4$, the same or different preferably represent hydrogen, a $C_1$-$C_4$ alkyl radical, preferably methyl and ethyl, or a $C_1$-$C_4$ alkyl radical optionally substituted by halogen atoms (chlorine, bromine) and/or a $C_6$-$C_{12}$ aryl radical, preferably phenyl, substituted by $C_1$-$C_4$ alkoxy groups, hydrogen is particularly preferred.

The tris-hydroxyalkyl triazolidine-3,5-diones corresponding to the above general formula are incorporated into the polymer by the formation of ester and/or urethane groups, so that the compound corresponding to above general formula (I) is co-condensed as cross-linking component in a polyester and/or polyurethane.

The esterification reaction by which the polymers according to the present invention are synthesised may be carried out using various polycarboxylic acids, partial or complete esters and/or anhydrides thereof, various polyols and even using hydroxy carboxylic acids. Polybasic carboxylic acids corresponding to the following general formula:

wherein A represents a bond or an x-functional, optionally substituted aliphatic radical preferably containing from 1 to 20 carbon atoms, a cycloaliphatic radical preferably containing from 5 to 15 carbon atoms, an aliphatic-aromatic radical preferably containing from 6 to 20 carbon atoms, an aromatic radical preferably containing from 6 to 15 carbon atoms or a $C_5$-$C_{12}$ aromatic or cycloaliphatic radical containing hetero atoms, such as N, O or S, in the ring; and x represents an integer of from 2 to 4, preferably 2; are particularly suitable.

Examples of such polybasic carboxylic acids include: oxalic acid, malonic acid, succinic acid, glutaric acid, adipic acid, trimethyl adipic acid, fumaric acid, maleic acid, hexahydroterephthalic acid, phthalic acid, isophthalic acid, terephthalic acid, benzene-1,3,5-tricarboxylic acid, benzene-1,2,4-tricarboxylic acid, benzene-1,2,3-tricarboxylic acid, naphthalene-1,5-dicarboxylic acid, benzophenone-4,4'-dicarboxylic acid, diphenyl sulphone-4,4'-dicarboxylic acid, butane tetracarboxylic acid, tricarballylic acid, ethylene tetracarboxylic acid, pyromellitic acid, benzene-1,2,3,4-tetracarboxylic acid, benzene-1,2,3,5-tetracarboxylic acid, benzene-1,2,4,5-tetracarboxylic acid and

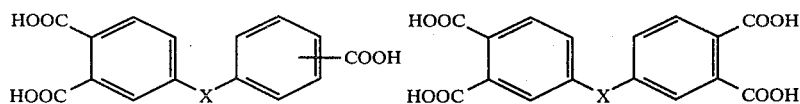

wherein X represents

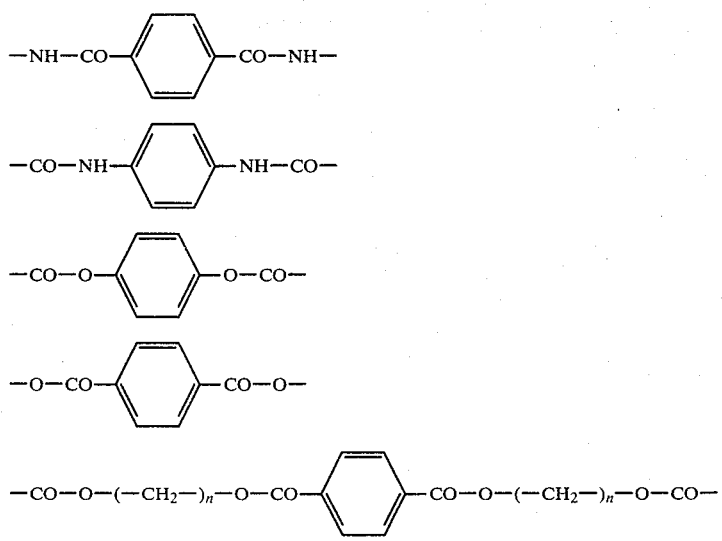

wherein n represents an integer of from 2 to 6 —CO—O—(—CH$_2$—)$_n$—O—CO— —O—, —S—, —SO$_2$—, —CO—, —N=N—, —CH$_2$—,

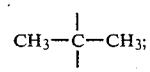

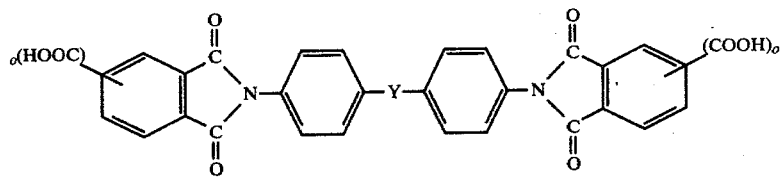

wherein
 o represents 1 or 2, and
 Y represents —O—, —S—, —SO$_2$—, —CO—, —N=N—, —CH$_2$—,

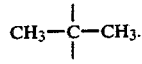

Examples of preferred polyhydric alcohols include: aliphatic diols containing from 2 to 20 carbon atoms, such as ethylene glycol, propylene glycol, dipropylene glycol, diethylene glycol, 1,4-butane diol, 1,6-hexane diol, dimethylol propane, neopentyl glycol, cycloaliphatic diols containing from 5 to 20 carbon atoms, such as cyclo-hexane-1,4-diol, 1,4-bis-hydroxymethyl cyclohexane and 2,2-bis-(4-hydroxy cyclohexyl)-propane, and araliphatic diols containing from 7 to 20 carbon atoms, such as 1,4-bis-hydroxymethyl benzene and 1,4-bis-(2-hydroxy ethoxy)-benzene and/or aliphatic triols containing from 3 to 20 carbon atoms, such as glycerol, 1,2,4-butane triol, trimethylol propane, trimethylol ethane, 1,2,6-hexane triol and/or tetraols containing from 4 to 20 carbon atoms, such as pentaerythritol and C$_2$-C$_{16}$ diols or triols containing hetero atoms, such as N, O or S, such as bis-hydroxyalkyl hydantoins and tris-hydroxyalkyl isocyanurates either as such or in the form of the constituent components, such as cyanuric acid triaryl ester and polyols.

Suitable hydroxycarboxylic acids correspond to the following general formula:

wherein A is as defined above; and y and z each independently represents an integer of from 1 to 3, preferably 1 or 2.

Examples include: glycolic acid, lactic acid, mandelic acid, malic acid, citric acid, tartaric acid, 2-, 3- or 4-hydroxy benzoic acids and hydroxy benzene dicarboxylic acids.

The carboxylic acids or carboxylic acid derivatives used and the polyols used may, of course, also be polymeric. Thus, it is possible to use, for example, bis-benzene dicarboxylic acid esters corresponding to the following general formula:

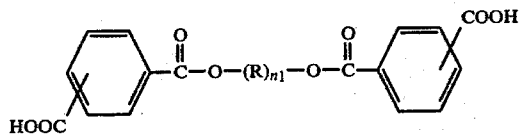

wherein R represents an at least difunctional aromatic radical containing from 5 to 15 carbon atoms, an araliphatic radical containing from 6 to 20 carbon atoms, a saturated or unsaturated aliphatic radical containing from 2 to 20 carbon atoms, a cycloaliphatic radical containing from 5 to 15 carbon atoms which may be condensed with aromatic (C$_6$-C$_{12}$), cycloaliphatic (C$_4$-C$_{12}$) or heterocyclic (C$_3$-C$_{11}$) ring systems and attached through ether, keto, ester or sulphone bridges and which may be optionally be substituted by halogen atoms, nitro or alkoxy groups containing from 1 to 20 carbon atoms; and n$_1$ is an integer of 1–7. Examples of (R)$_{n1}$ include:

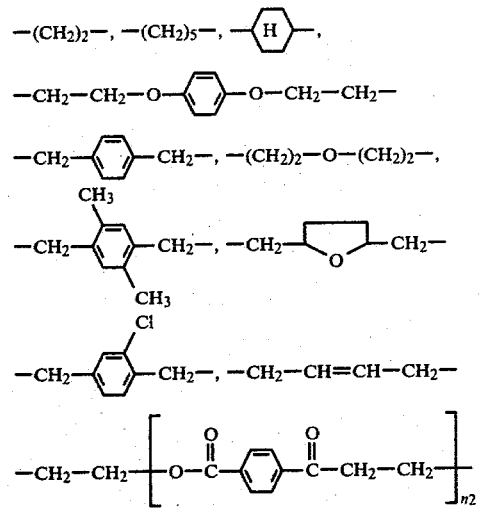

wherein n$_2$ represents an integer of from 1 to 7.

In addition, it is also possible to use polymeric polyesters containing hydroxyl groups of the type obtained from the above-mentioned polybasic carboxylic acids or derivatives thereof and polyols. These polyesters containing carboxyl groups or derivatives thereof and hydroxyl groups which are used in accordance with the present invention may be produced in a preliminary reaction, although they may also be produced and subsequently reacted with the N,N',N''-tris-hydroxyalkyl triazolidine-3,5-diones used in accordance with the present invention.

The quantitative ratios between the polyols and polybasic carboxylic acids used may be varied virtually as required. Thus, it is possible to produce polyesters containing hydroxyl groups which may then be directly applied, possibly from a solution, to wires, for example. However, such polyesters containing hydroxyl groups may also be further reacted in the same way as the polyesters containing carboxyl groups. Thus, these polyesters containing hydroxyl groups, optionally in admixture with pure N,N,N''-tris-hydroxyalkyl triazolidine 3,5-diones used in accordance with the present invention, may be reacted with polyisocyanates to form polyurethanes.

The catalysts normally used in isocyanate chemistry may be used for this reaction. Suitable catalysts include the known catalysts, for example tertiary amines, such as triethylamine, tributylamine, N-methyl morpholine, N-ethyl morpholine, N-coomorpholine, N,N,N',N'-tetramethyl ethylene diamine, 1,4-diazabicyclo-(2,2,2)-octane, N-methyl-N'-dimethyl aminoethyl piperazine, N,N-dimethyl benzylamine, bis-(N,N-diethylaminoethyl)-adipate, N,N-diethyl benzylamine, pentamethyl diethylene triamine, N,N-dimethyl cyclohexylamine, N,N,N',N'-tetramethyl-1,3-butane diamine, N,N-dimethyl-β-phenylethylamine, 1,2-dimethyl imidazole, 2-methyl imidazole and tertiary amines containing isocyanate-reactive hydrogen atoms, such as triethanolamine, triisopropanolamine, N-methyl diethanolamine and N-ethyl diethanolamine.

Other suitable catalysts include sila-amines containing carbon-silicon bonds of the type described, for example, in German Pat. No. 1,229,290, for example 2,2,4-trimethyl-2-silamorpholine and 1,3-diethylaminomethyl tetramethyl disiloxane.

Other suitable catalysts include nitrogen-containing bases, such as tetraalkyl ammonium hydroxides, also alkali metal hydroxides, such as sodium hydroxide, alkali metal phenolates, such as sodium phenolate, or alkali metal alcoholates, such as sodium methylate. Hexahydrotriazine may also be used as catalysts.

According to the present invention, it is also possible to use organometallic compounds, particularly organotin compounds, preferably tin(II)salts of carboxylic acids, such as tin(II)acetate, tin(II)octoate, tin(II)ethyl hexoate and tin(II)laurate, also the dialkyl tin salts of carboxylic acids, such as dibutyl tin diacetate, dibutyl tin dilaurate, dibutyl tin maleate or dioctyl tin, as catalysts.

Suitable polyisocyanates include aliphatic, cycloaliphatic, araliphatic, aromatic and heterocyclic polyisocyanates (cf. Annalen 562, pages 75 to 136), for example ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and 1,4-diisocyanate and mixtures of these isomers, 1-isocyanato-3,3,5-trimethyl-5-isocyanatomethyl cyclohexane (DAS No. 1,202,785), 2,4- and 2,6-hexahydrotolylene diisocyanate and mixtures of these isomers, hexahydro-1,3- and/or 1,4-phenylene diisocyanate, perhydro-2,4'- and/or -4,4'-diphenyl methane diisocyanate, 1,3- and 1,4-phenylene diisocyanate, 2,4- and 2,6-tolylene diisocyanate and mixtures of these isomers, diphenyl methane-2,4'-and/or 4,4'-diisocyanate, naphthalylene-1,5-diisocyanate, triphenylmethane-4,4',4''-triisocyanate, polyphenylpolymethylene polyisocyanates of the type obtained by condensing aniline with formaldehyde, followed by phosgenation, and described, for example, in British Pat. Nos. 874,430 and 848,671, perchlorinated aryl polyisocyanates of the type described, for example, in German Auslegeschrift No. 1,157,601, polyisocyanates containing carbodiimide groups of the type described in German Pat. No. 1,092,007, diisocyanates of the type described in U.S. Pat. No. 3,492,330, polyisocyanates containing allophonate groups of the type described, for example, in British Pat. No. 994,890, in Belgian Pat. No. 761,626 and in Published Dutch Patent Application No. 7,102,524, polyisocyanates containing isocyanurate groups of the type described, for example, in German Pat. Nos. 1,022,789; 1,222,067 and 1,027,394 and in German Offenlegungsschrift Nos. 1,929,034 and 2,004,048.

The isocyanurate polyisocyanates used are preferably compounds corresponding to the following general formula:

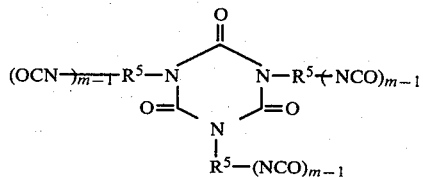

wherein $R^5$ represents the organic residue of the isocyanate compound defined below; and m represents an integer of from 1 to 4. Such compounds may even be produced separately, for example in accordance with German Auslegeschrift No. 1,035,362, or in situ from corresponding organic isocyanates.

It is also possible to use polyisocyanates containing urethane groups of the type described, for example, in Belgian Pat. No. 752,261 or in U.S. Pat. No. 3,394,164, polyisocyanates containing acylated urea groups according to German Pat. No. 1,230,778, polyisocyanates containing biuret groups of the type described, for example, in German Pat. No. 1,101,394, in British Pat. No. 889,050 and in French Pat. No. 7,017,514, polyisocyanates produced by telomerisation reactions of the type described, for example, in Belgian Pat. No. 723,640, polyisocyanates containing ester groups of the type described, for example, in British Pat. Nos. 956,474 and 1,072,956, in U.S. Pat. No. 3,567,763 and in German Pat. No. 1,231,688 and reaction products of the above-mentioned isocyanates with acetals according to German Pat. No. 1,072,358.

It is also possible to use the distillation residues containing isocyanate groups which are obtained in the commercial production of isocyanates, optionally in solution in one or more of the above-mentioned polyisocyanates. Mixtures of the above-mentioned polyisocyanates may also be used.

It is preferred to use isocyanates corresponding to the following general formula:

$$R^5(NCO)_m$$

wherein $R^5$ represents a $C_2$–$C_{20}$ alkyl radical optionally substituted by halogen, $C_1$–$C_{10}$ alkyl and/or $C_6$–$C_{12}$ aryl groups, an aryl radical containing from 5 to 12 carbon atoms, a cycloalkyl radical containing from 5 to 12 carbon atoms, an alkyl-aryl radical containing from 6 to 20 carbon atoms or a $C_5$–$C_{12}$ aryl or cycloalkyl radical containing hetero atoms, such as N, O or S, in the ring; and m represents an integer of from 1 to 4, preferably from 1 to 3 and, with particular preference, 2. Aliphatic radicals containing from 2 to 12 carbon atoms or an aryl radical, such as phenyl, tolyl, naphthyl, diphenylmethane and diphenylether radicals, are particularly preferred.

It is preferred to use the readily commercially obtainable mixtures of tolylene diisocyanates, m-phenylene diisocyanates and phosgenated condensates of aniline and formaldehyde having a polyphenylenemethylene structure and the symmetrical compounds 4,4'-diisocyanatodiphenylmethane, 4,4'-diisocyanatodiphenyl ether, p-phenylene diisocyanate and 4,4'-diisocyanatodiphenyl dimethyl methane, also isophorone diisocyanate and hexamethylene diisocyanate.

The inventive polymers crosslinked may be directly used as lacquers or mouldings, although they may be further reacted because of the relatively low stability of the urethane groups. They are particularly suitable for the incorporation of imide and/or amide groups which are formed by reaction with various polycarboxylic acids and cyclic carboxylic acid anhydrides.

Suitable polycarboxylic acids include the polycarboxylic acids described above, whilst the cyclic carboxylic acid anhydrides preferably correspond to the following general formula:

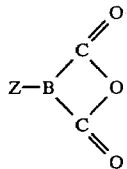

wherein B represents an aliphatic radical containing from 2 to 20 carbon atoms, a cycloaliphatic radical containing from 5 to 15 carbon atoms or an aromatic radical containing from 6 to 20 carbon atoms; and Z represents another cyclic anhydride group, a carboxyl group or an hydroxyl group. The radical B may be substituted, for example by halogen atoms.

The following are examples of these cyclic carboxylic acid anhydrides preferably substituted by carboxyl groups:

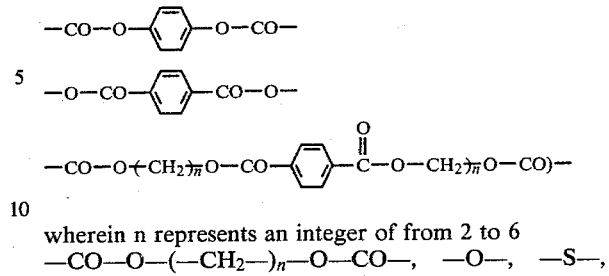

wherein n represents an integer of from 2 to 6
—CO—O—(—CH$_2$—)$_n$—O—CO—, —O—, —S—, —SO$_2$—, —CO—, —N=N, —CH$_2$—,

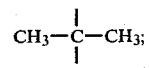

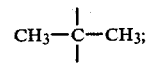

wherein o represents 1 or 2; and Y represents —O—, —S—, —SO$_2$—, —CO—, —N=N—, —CH$_2$—,

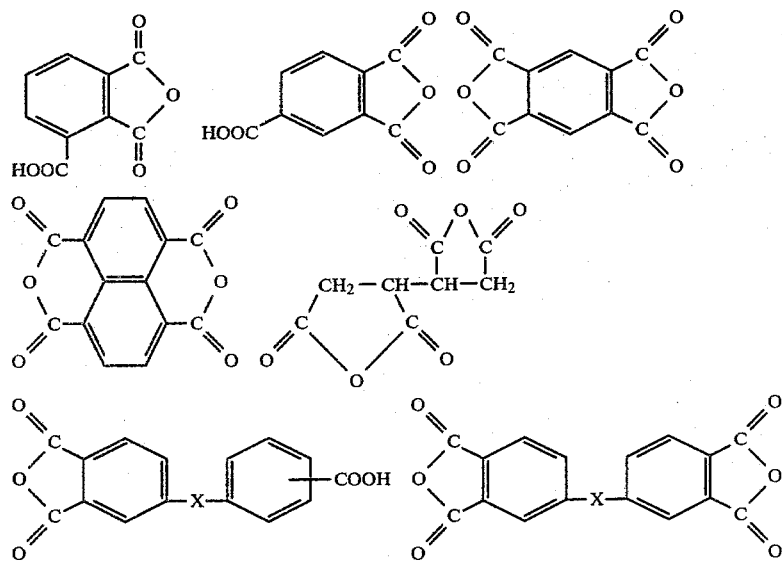

wherein
X represents

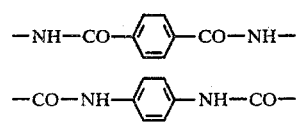

However, the imide and/or amide groups may even be directly incorporated from the described cyclic anhydrides of polybasic carboxylic acid and/or polycarboxylic acids by reaction with the free, above-described polyisocyanates or with the polyamines derived therefrom.

The isocyanates may be used in free form and also partly or completely in the form of derivatives which may be obtained by reaction with compounds containing reactive hydrogen and which react as isocyanate donors under the reaction conditions.

Preferred donors are the addition products of lactams, oximes and CH-acidic compounds and also the carbamic acid esters obtained from aliphatic and aromatic monohydroxy and polyhydroxy compounds, for example corresponding to the following general formula:

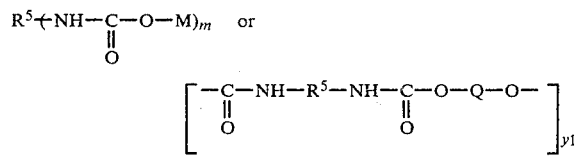

wherein $R^5$ and m are as defined above;

M represents the organic residue of a monohydroxy compound; and

Q represents the organic residue of a bis- or tris-functional hydroxy compound;

M and Q, which may be the same or different, preferably represent an aliphatic radical containing from 1 to 20 carbon atoms, an aliphatic aromatic radical containing from 7 to 15 carbon atoms and an aromatic radical containing from 6 to 15 carbon atoms which may each be substituted by $C_1-C_{10}$ alkyl and/or $C_6-C_{12}$ aryl groups; and $y_1$ represents an integer of from 1 to 1000, preferably from 1 to 100.

Examples of these carbamic acid esters include the carbamic acid esters of phenol, isomeric cresols, technical mixtures thereof aliphatic monoalcohols, such as methanol, ethanol, propanol, isopropanol, butanol, isobutanol, cyclohexanol, allyl alcohol, benzyl alcohol and aliphatic diols or polyols, such as ethylene glycol and trimethylol propane, glycerol and/or tris-hydroxy alkyl isocyanurates, etc., also the addition products with 2-pyrrolidone, caprolactam, butanone oxime, malonic esters, acetoacetic esters and acetophenone.

The isocyanate donors may either be used as such or may be formed in situ by reaction with the corresponding reactants.

Instead of the above-mentioned (poly)isocyanates, it is also possible to use the corresponding (poly)isothiocyanates as starting materials.

The hydroxylalkyl ethers which, according to the present invention, are used with particular preference as blocking agents and solvents are, for example, compounds corresponding to the following general formula:

$$R_6+OR_7)_pOH$$

wherein $R^6$ represents an optionally substituted aliphatic radical containing from 1 to 20 carbon atoms, preferably from 1 to 8 carbon atoms, a cycloaliphatic radical containing from 3 to 10 carbon atoms, preferably from 5 to 8 carbon atoms, and aliphatic-aromatic radical containing from 7 to 15 carbon atoms or an aromatic radical containing from 6 to 14 carbon atoms which may be substituted, for example, by alkoxy, aroxy or hydroxy groups;

$R^7$ represents an aliphatic radical containing from 2 to 20 carbon atoms; and p represents an integer of from 1 to 100, preferably from 1 to 4.

According to the present invention, it is preferred to use hydroxy alkyl ethers of the type which contain one hydroxy group per molecule and wherein $R^7$ represents a radical containing two carbon atoms in the chain which may be substituted, for example, by alkyl groups, for example the methyl, isopropyl, cyclohexyl, benzyl, phenyl and methoxyethyl ethylene glycol and propylene glycol or diethylene glycol and dipropylene glycol monoethers.

The imide and/or amide groups may be incorporated in the polymers according to the present invention in an operation carried out subsequently or simultaneously with the production of the polyester. It is, of course, also possible to produce a polyamide and/or imide containing terminal reactive groups, for example carboxyl groups, which is then incorporated into the polyester by condensation together with the N,N',N''-tris-hydroxyalkyl triazolidine-3,5-diones used in accordance with the present invention.

The formation of hydantoin groups for the synthesis of the polymers according to the present invention may be carried out using the above-mentioned, optionally blocked isocyanates and with polyfunctional, preferably difunctional, α-aminocarboxylic acid derivatives corresponding to the following general formula:

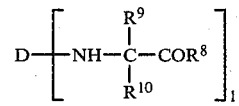

wherein D represents an optionally substituted aliphatic radical containing from 2 to 20 carbon atoms, a cycloaliphatic radical containing from 5 to 15 carbon atoms, an aliphatic-aromatic radical containing from 7 to 20 carbon atoms, an aromatic radical containing from 6 to 15 carbon atoms and a $C_4-C_{15}$ aromatic or cycloaliphatic radical containing hetero atoms, such as N, O or S, in the ring, all of which may optionally be substituted by halogen, $C_1-C_{10}$ alkyl and/or $C_6-C_{12}$ aryl groups; $R^9$ and $R^{10}$ represent hydrogen, an optionally substituted aliphatic radical containing from 1 to 20 carbon atoms, an aromatic radical containing from 5 to 15 carbon atoms, an aromatic-aliphatic radical containing from 6 to 20 carbon atoms or a cycloaliphatic radical containing from 5 to 15 carbon atoms; $R^8$ represents a hydroxyl group, an amino group, a $C_1-C_{20}$ alkylamino, $C_1-C_{20}$ dialkylamino, $C_1-C_{20}$ alkoxy or $C_5-C_{15}$ aroxy group; and l represents an integer of from 2 to 4, preferably 2. These polyfunctional α-aminocarboxylic acid derivatives are known from U.S. Pat. No. 3,397,253.

The aromatic radicals of D are derived in particular from benzene, azobenzene, naphthalene, anthracene, diphenyl, triphenylmethane, diphenylmethane and diphenyl ether. These radicals may also be substituted one or more times, for example by $C_1-C_{20}$ alkyl (methyl), halogen (chlorine), nitro, $C_1-C_{20}$ alkoxy (methoxy), $C_1-C_{20}$ dialkylamino (dimethylamino), acyl (acetyl), $C_2-C_{17}$ carbalkoxy (carbomethoxy or carboethoxy) and cyano groups. The benzene, naphthalene, diphenylmethane or diphenyl ether derivatives optionally substituted once or twice by methyl and/or chlorine are preferred. The radicals $R^9$ and $R^{10}$ may be substituted by halogen (chlorine, bromine), cyano, hydroxycarbonyl, aminocarbonyl, alkoxycarbonyl or aroxycarbonyl.

The production of the α-aminocarboxylic acid derivatives used as starting materials in accordance with the present invention is known and may be carried out, for example, by reacting aromatic polyamines with acetic acid or derivatives thereof or even by condensation with hydrocyanic acid and aldehydes or ketones, followed by conversion of the nitrile group into, for example, carboxylic acid, ester or amide.

α-aminocarboxylic acids corresponding to the following general formula:

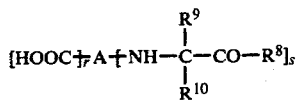

wherein A, $R^8$, $R^9$ and $R^{10}$ are as defined above; and r and s each independently represents an integer of from 1 to 3, preferably 1 or 2;
are also suitable for the incorporation of hydantoin groups. The production of these compounds is known and may be carried out from the corresponding aminocarboxylic acids in accordance with U.S. Pat. No. 3,397,253. To this end, it is possible to use, for example, 2-,3- and 4-aminobenzoic acids, 4-chloro-3-aminobenzoic acid, 2-, 4- or 5-aminoisophthalic acid, 1-aminoanthraquinone-2-carboxylic acid, 4-aminoanthraquinone-1-carboxylic acid, 4-aminonaphthalene-1,8-dicarboxylic acid, 2,4- and 3,4-diaminobenzoic acid, aminoacetic acid, aminopropionic acid, aminobutyric acids or aminocaproic acids.

However, the hydantoin-forming reactions and also the esterification reaction may be further accelerated by means of known catalysts, for example tertiary amines, such as endoethylene piperazine, metal compounds such as titanium tetrabutylate or iron acetylacetonate, and acids, such as p-toluene sulphonic acid. The incorporation of the hydantoin rings into the polymers according to the present invention may be carried out in a subsequent operation, although it may even be carried out at the same time as the formation of ester, amide or imide groups in a one-pot reaction. The polymers according to the present invention may also be produced by preparing polyhydantoins, optionally containing reactive terminal groups, such as isocyanate and/or carboxyl groups, in a preliminary reaction carried out in the melt or in solvents and introducing these polyhydantoins together with the N,N',N"-tris-hydroxyalkyl triazolidine-3,5-diones and optionally together with amide and/or imide and/or isocyanurate into the polymer according to the present invention in a subsequent operation, in which case the solvent optionally present from production of the polyhydantoin may be removed during completion of the condensation process. The solvent used in the production of the polyhydantoin may, of course, be a so-called "reactive diluent" providing it may be subsequently incorporated by condensation into the other condensation component, as is the case, for example, using alkane dicarboxylic acid and benzene dicarboxylic acid esters.

For carrying out the process according to the present invention, the reaction components are maintained for from a few minutes to several days, at temperatures of from −20° to +500° C., preferably from 20° to 400° C., in the presence or absence of solvents and/or blocking agents. The course of the reaction may be followed from any evolution of gas which occurs and/or IR-spectroscopy and/or by viscosity measurements. The polymers according to the present invention containing tris-hydroxyalkyl triazolidine-3,5 diones generally have solution viscosities of from 50 to 500,000 mPa.s and preferably from 100 to 200,000 mPa.s, as measured using from 15 to 50% by weight solutions in benzyl alcohols, carbitol, γ-butyrolactone or cresol, at 25° C.

From 1 to 60%, preferably from 10 to 40%, of tris-hydroxyalkyl triazolidine-3,5-dione are generally used as cross-linking component in the production of the polymers according to the present invention. The polyisocyanates and polybasic carboxylic acids responsible for the cross-linking reaction are generally used in excess, although significant deviations from these quantitative ratios are also possible to enable the property profile of the polymers according to the present invention to be adapted to various application. The polyfunctional α-aminocarboxylic acid derivatives used for incorporating the hydantoin groups into the polymers according to the present invention may be used in widely varying quantities of from 1 to 4 mole percent, preferably from 5 to 30%. However, it is preferred to use only those molar ratios which give at least fusible and/or soluble products.

On the other hand, both the tris-hydroxyalkyl triazolidine-3,5-diones and also the carboxylic acids and/or esters and/or anhydrides thereof and/or the isocyanates may be used in various quantities, preferably in excess, and may be reacted either simultaneously or subsequently with optionally polyfunctional amines, optionally polyhydric alcohols, such as ethylene glycol, dipropylene diglycol, trimethylol propane, glycerol, tris-hydroxyethyl isocyanurate and/or mixtures of cyanuric acid triaryl esters and polyols, optionally using further polyisocyanates or polyisocyanate donors and/or using α-aminocarboxylic acid derivatives, and/or optionally using further polycarboxylic acids and/or anhydrides and/or optionally oligomeric esters thereof and optionally in the presence of additives and auxiliaries, such as ε-caprolactam or ε-caprolactone, to form branched polymers containing triazolidine-3,5-dione rings and, for example, urethane, ester, imide, amide, hydantoin and/or isocyanurate groups and characterised by high solubility, outstanding heat resistance and high elasticity.

The condensation products according to the present invention or even the preliminary stages thereof may, of course, be added to and mixed with polyesters, preferably polyesters containing hydroxyl groups, for example preferably of maleic acid anhydride, phthalic acid anhydride, and/or maleic acid, fumaric acid, succinic acid, phthalic acid, isophthalic acid, terephthalic acid, trimellitic acid and/or trimellitic acid anhydride and/or esters thereof, ethylene glycol, dipropylene glycol, glycerol, trimethylol propane and/or tris-hydroxy ethyl isocyanurate and/or the combination of cyanuric acid triaryl esters and polyols, polyethers, for example of ethylene oxide and/or bis-(hydroxyphenyl)-propane and epichlorohydrin, polyurethanes, polyamides, polyolefins, polyacetals, polyepoxides, polyimides, polyamide imides, polyester imides, polyesters, polyimino polyesters, polyimide isocyanates, polyhydantoins or polyhydantoin isocyanates, or alternatively the polymers according to the present invention may be produced in the presence of these components. In every case, polymers are also formed which, in addition to the N,N',N"-trishydroxyalkyl triazolidine-3,5-diones as crosslinking component, contain additional ester, urethane, amide, imide, ester amide, ester imide, amide imide, (iso) cyanurate and/or hydantoin groups.

The quantitative ratios of these additives may vary within wide limits in the binder mixture, quantities of from 5 to 500%, by weight, based on the condensate according to the present invention, preferably being used.

The polycondensates containing triazolidine-3,5-dione groups are particularly suitable for stoving lacquers, particularly wire and electrical insulation lacquers. The binders or binder mixtures are generally used in solvents or solvent mixtures to which a certain quantity of, preferably, non-solvents or diluents may additionally be added. These diluents are preferably aliphatic and aromatic hydrocarbons, such as cyclohexane, toluene, xylene and technical mixtures thereof, such as "Solvesso" and solvent naphtha.

Suitable solvents are phenolic compounds, such as phenols, cresols and xylenols and, preferably, non-phenolic solvents, such as alcohols, esters, cyclic esters, ketones, ethers, substituted amides, nitriles, for example benzyl alcohol, phenoxy ethanol, acetophenone, cyclohexanone, propylene carbonate, ε-caprolactam, ethylene glycol butyl ether, diethylene glycol methyl ether, glycol monomethyl ether acetate, γ-butyrolactone, benzoic acid alkyl ester, N-methyl pyrrolidone, dimethyl formamide, benzonitrile or mixtures thereof.

The solids content of the lacquer solutions or lacquer mixtures may vary within wide limits and is determined by the behaviour of the binders in solution and also be the application envisaged. The solids content is preferably from 20 to 70%, by weight. The polymers crosslinked through triazolidine dione groups show excellent solubility and may be processed in conventional lacquering machines both in the form of impregnating lacquers having a solids content of up to 60% and, if desired, even from the melt or in powder form.

Furthermore, the hardening reaction of the coating composition may be accelerated, i.e. the reaction times shortened or the stoving temperature lowered, by the addition of known catalysts, such as bases, for example triethylamine, N-methyl morpholine and endoethylene piperazine; acids, for example p-toluene sulphonic acid; metals compounds, particularly of iron, lead, zinc, tin, copper, cobalt, titanium, manganese, for example titanium tetrabutylate, iron acetylacetonate, dibutyl tin laurate, lead acetate and zinc octoate.

The process according to the present invention is illustrated by the following Examples.

EXAMPLE 1

56.7 g of trimellitic acid anhydride are dissolved in 300 g of γ-butyrolactone. Following the addition of 298.5 g of N,N'-bis-[methoxy carbonyl propyl-(2)-]-4,4'-diamino diphenylmethane at from 30° to 35° C., 350 g of 4,4'-diisocyanatodiphenylmethane are introduced in portions. The solution is stirred for 2 hours at 35° C. and left standing overnight. Following the addition of 0.75 g of endoethylene piperazine, another 175 g of 4,4'-diisocyanatodiphenylmethane, 384 g of trimellitic acid anhydride, 200 g of terephthalic acid dimethyl ester and 100 g of toluene are introduced and the mixture homogenised for 30 minutes at 50° C.

The mixture is then heated to 200° C. with elimination of carbon dioxide, methanol and toluene, followed by condensation for 5 hours at 200° C.

479 g of terephthalic acid dimethyl ester, 583 g of N,N',N''-tris-hydroxyethyl triazolidine-3,5-dione, 3 g of lead acetate, 1 g of titanium tetrabutylate and 50 g of xylene are then added to the mixture at 170° C., followed by condensation for about 6 hours at temperatures of up to 220° C. until no more distillate passes over below 150° C. Then, 186 g of glycol and 31 g of glycerol are added at 170° C., after which the mixture is again subjected to condensation for 3 hours at temperatures of up to 220° C. and then at 230° C. first directly and, finally, in vacuo until a sample diluted to 50% by weight with γ-butyrolactone has a viscosity of approximately 16,000 mPa.s at 25° C. For the wire-lacquering test, the mixture was diluted with 1850 g of γ-butyrolactone, followed by the addition of 21.5 g of titanium tetrabutylate which had been stabilised in 43 g of cresol.

The approximately 50% by weight lacquer solution has a viscosity of 16730 mPa.s at 25° C. and, for lacquering, is further diluted with a mixture of benzyl alcohol/solvent naphtha (ratio 3:2) to form a 35% by weight lacquer solution with which a 0.7 mm diameter copper wire is lacquered in a stoving oven.

| Oven length: | 4 m |
| Oven temperature: | 400° C. |
| Number of passes: | 6 |

A lacquer film 25 μm thick (corresponding to an increased in the diameter of the wire of 50 um) having a softening temperature of >325° C., a heat shock of 260° C., an abrasion resistance (NEMA) of 60 and elongation of 88% is obtained at a take-off rate of 9 meters per minutes.

EXAMPLE 2

4.8 g of isophthalic acid and 33.6 g of trimellitic acid are added at room temperature to 419 g of a solution of N,N'-bis-[methoxy carbonyl propyl-(2)-]-4,4'-diaminodiphenyl methane in a mixture of 36% by weight of γ-butyrolactone and 64% by weight of toluene (29.2% N), followed by the addition at 50° C. of 204 g of 4,4'-diisocyanatodiphenylmethane. After stirring for 2 hours at 50° C., another 87.4 g of 4,4'-diisocyanatodiphenyl methane and 0.6 g of endoethylene piperazine are added at 50° C., followed by homogenisation for 1 hour at 50° C. Then another 201.2 g of trimellitic acid anhydride and 120 g of terephthalic acid dimethyl ester are added to this solution in portions at 50° C., followed by homogenisation for 30 minutes at 50° C. The suspension obtained is left standing overnight at room temperature and, on the following day, is heated to 205° C. with elimination of carbon dioxide, methanol and toluene, maintained for 3 hours at 205° C. and, then, for 1 hour at 215° C. 218.8 g of terephthalic acid dimethyl ester are then added at from 170° to 180° C., followed by the addition at from 150° to 160° C. of 318 g of N,N',N''-tris-hydroxyethyl triazolidine-3,5-dione, 1.8 g of lead acetate and 0.6 g of titanium tetrabutylate. The mixture is then heated for 2 hours to 170° C. Then 30 g of xylene and 160 g of a polyester produced from 4 moles of terephthalic acid, 1.5 moles of glycerol and 3 moles of glycol (OH-content 4.53%, acid number 4.8 mg KOH) are added at from 160° to 170° C., after which the mixture is again subjected to condensation for 3 hours at from 200° to 220° C. first directly and, finally, in vacuo until a sample diluted to 50% by weight with γ-butyrolactone has a viscosity of approximately 10,000 mPa.s at 25° C. 1501 g of a brittle, approximately 80% by weight resin are obtained, of which a 15% by weight solution in γ-butyrolactone has a viscosity of 156 mPa.s at 25° C.

For the wire lacquering test, 500 g of this resin are diluted in 300 g of butyrolactone and 300 g of benzyl alcohol, followed by the addition of 7.5 g of titanium tetrabutylate which had been stabilised in 15 g of cresol. The resulting mixture is used as in Example 1 for lacquering a 0.7 mm diameter copper wire. A lacquer film 25 μm thick (corresponding to an increase in the diameter of the wire of 50 um) having a softening point of >330° C., a heat shock of 260° C., an abrasion resistance (NEMA) of 45 and an outer fibre elongation of 88% is obtained at a take-off rate of 10 meters per minute.

EXAMPLE 3

815 g of a brittle resin containing 6.67% of hydroxyl groups were obtained from 582 g of terephthalic acid dimethyl ester, 138 g of glycerol, 62 g of glycol, 233 g of tris-hydroxyethyl triazolidine-3,5-dione and 50 g of xylene, to which 1 g of lead acetate and 0.5 g of titanium tetrabutylate had been added after melting and which were condensed under the conventional esterification conditions at temperatures of up to 220° C., ultimately in vacuo. The resin has a viscosity of 137 mPa.s, as measured at 25° C. using a 15% by weight solution in a technical cresol containing approximately 70% by weight of m-cresol. The polyester is soluble in environmentally acceptable solvents, such as carbitol and benzyl alcohol, in which it forms both 30% by weight and also 50% by weight solutions.

For the wire lacquering test, 400 g of this resin are dissolved in 600 g of technical m-cresol and the resulting solution diluted to 35% by weight with a mixture of m-cresol and xylene (1:1). Following the addition of 6 g of titanium tetrabutylate, which had been stabilised in 12 g of cresol, the product was used as in Example 1 for lacquering a 0.7 mm diameter copper wire.

A lacquer film 25 μm thick (corresponding to an increased in diameter of 50 μm) having a softening temperature of >320° C., a heat shock of 155° C., an outer fibre elongation of 67% and an abrasion resistance (NEMA) of 27 is obtained at a take-off rate of 9 meters per minute.

EXAMPLE 4

500 g of a polyester having an acid number of 4.8 and a hydroxyl number of 150, produced from 4 moles of terephthalic acid, 1.5 moles of glycerol and 3 moles of glycol, are melted, 233 g of tris-hydroxyethyl triazolidine-3,5-dione and 1 g of lead acetate were added to the resulting melt which was then condensed under the conventional esterification conditions at temperatures of up to 220° C., ultimately in vacuo, to form 660 g of a brittle polyester resin having an acid number of 1.2 and a hydroxyl number of 194. This resin is soluble in carbitol in concentrations of 30% by weight and 50% by weight. Without tris-hydroxyethyl triazolidine-3,5-dione, the polyester is insoluble in Carbitol.

For the wire lacquering test, a 40% by weight solution in technical m-cresol is prepared and, after the addition of 1.5% by weight of titanium tetrabutylate stabilised in cresol, is used as in Example 1 for lacquering a 0.7 mm diameter copper wire. A lacquer film 25 μm thick (corresponding to an increase in diameter of the wire of 50 μm) having a softening temperature of >325° C., an abrasion resistance (NEMA) of 15 and an outer fibre elongation of 88% is obtained at a take-off rate of 9 meters per minute.

EXAMPLE 5

186 g of glycol, 582 g of terephthalic acid dimethyl ester, 233 g of tris-hydroxyethyl triazolidine-3,5-dione and 273 g of bis-imidodicarboxylic acid, obtained by heating 2 moles of trimellitic acid anhydride and 1 mole of 4,4'-diaminodiphenylmethane for 6 hours to 150° C. in cresol, followed by filtration under suction, are melted and 3 g of lead acetate added to the resulting melt which was then condensed at temperatures of up to 220° C., ultimately in vacuo, to form a brittle polyester imide resin of which a 15% by weight solution in technical m-cresol has a viscosity of 110 mPa.s. this polyester imide remains soluble for weeks in various concentrations both in Carbitol and benzyl alcohol.

For the wire lacquering test, a 40% by weight solution in technical m-cresol is prepared and, after dilution withe cresol/xylene (1:1) to a solid resin content of 35% by weight followed by the addition of 1.5% by weight of titanium tetrabutylate stabilised in cresol, is used as in Example 1 for lacquering a 0.7 mm diameter copper wire. A lacquer film 25 μm thick (corresponding to an increase in diameter of 50 μm) having a softening temperature of >320° C., a heat shock of 260° C., an abrasion resistance (NEMA) of 18, an outer fibre elongation of 88% and a long-term heat resistance of at least 2 weeks at 180° C. is obtained at a take-off rate of 7 meters per minute.

EXAMPLE 6

174 g of a mixture of 80% of 2,4- and 20% of 2,6-tolylene diisocyanate are introduced at 120° C. into 186 g of ethylene glycol. After heating to 140° C., 384 g of trimellitic acid anhydride are added and the mixture stirred for 10 hours at from 190° to 210° C. After cooling to 170° C., 46 g of glycerol, 117 g of 1,3,5-trishydroxy ethyl triazolidine dione, 381 g of terephthalic acid-bis-glycol ester and 1.3 g of Pb acetate are introduced and the condensation reaction completed over a period of 5 hours at 205° C. The polyester imide solidifies on cooling to form a clear brown resin. The viscosity ($\eta_{25}$) of a 15% by weight solution in cresol amounts to 80 mPas. The IR spectrum shows the bands characteristic of imides at 1715 and 1775 cm$^1$. To prepare a lacquer solution, the resin is dissolved to a solids content of 30% by weight in a solvent mixture of cresol and xylene (ratio 4:1), followed by the addition of 1.5% by weight of titanium tetrabutylate. A 0.7 mm diameter copper wire is lacquered using this solution in a wire lacquering machine. The length of the furnace is 4 meters and the temperature therein is 400° C. Under these conditions, a coated wire having a softening temperature of more than 300° C. and an elasticity of 88% is obtained at a lacquering speed of 9 meters per minute.

EXAMPLE 7

340 g of a technical cresol mixture, 68 g of ethylene glycol and 47 g of tris-hydroxy ethyl triazolidine dione are initially introduced, followed by the addition, at 120° C., of 174 g of 2,4-tolylene diisocyanate. 384 g of trimellitic acid anhydride are then introduced, after which the reaction mixture is rapidly heated to 180° C. and then, over a period of 8 hours, to 210° C. The condensation reaction by which the ester imide is formed is accompanied by the elimination of carbon dioxide and water. The reaction mixture is then stirred for 2 hours at 210° C. and diluted with 450 g of phenol. A brown viscous solution of the polyester imide is obtained. A 15% by weight solution in cresol has a viscosity ($\eta_{25}$) of 320 mPas.

To a sample of the solution of the reaction product is added the same quantity (based on the solids content) of a polyester of terephthalic acid, glycerol and ethylene glycol and 1.5% by weight of titanium tetrabutylate. This lacquer solution is applied to a glass plate and stoved, first at 200° C. and then at 300° C., to form a clear plastic lacquer film.

EXAMPLE 8

157 g of a mixture of 80% of 2,4- and 20% of 2,6-tolylene diisocyanate are added, at 120° C., to 186 g of ethylene glycol and 117 g of tris-hydroxy ethyl triazolidine dione. 384 g of trimellitic acid anhydride are then added at 140° C. The mixture is then heated to 190° C., the temperature thereof then being raised to 210° C. over a period of 10 hours. The polyester imide is obtained in the form of a melt which solidifies on cooling to form a brown resin. A 15% by weight solution in cresol has a viscosity ($\eta_{25}$) of 110 mPas.

A lacquer solution of equal parts of the resin, a polyester of terephthalic acid, ethylene glycol and glycerol and 1.5% by weight of titanium tetrabutylate in cresol is applied to a metal plate and stoved, first at 200° C. and then at 300° C., to form a clear, elastic lacquer film.

EXAMPLE 9

186 g of ethylene glycol, 0.2 g of triethylene diamine, 80 g of 4,4'-bis-(methoxy carbonyl propyl amino)-diphenyl methane and 117 g of tris-hydroxy ethyl triazolidine dione are initially introduced, followed by the addition of 174 g of 2,4-tolylene diisocyanate at from 40° to 50° C. and 384 g of trimellitic acid anhydride at 120° C. The reaction mixture is heated to 190° C., after which the temperature thereof is raised to 210° C. over a period of 10 hours to carry out the condensation reaction. The reaction is accompanied by the elimination of carbon dioxide, methanol and water. The polyester imide hydantoin solidifies on cooling to form a clear brittle resin. A 15% by weight solution in cresol has a viscosity ($\eta_{25}$) of 90 mPas. A sample in the form of a solution in cresol containing an equal quantity of a polyester of terephthalic acid, ethylene glycol and glycerol and titanium tetrabutylate as catalyst is applied to a glass plate and stoved, first at 200° C. and then at 300° C., to form a clear elastic lacquer film.

EXAMPLE 10

100 g of "Solvesso 100" (a mixture of technical aromatic alkyl compounds), 93 g of tris-hydroxy ethyl triazolidine dione, 388 g of terephthalic acid dimethyl ester, 310 g of ethylene glycol, 46 g of glycerol and 1 g of Pb acetate are heated to 190° C. for 3 hours and maintained at that temperature until no more methanol distills over. 99 g of 4,4'-diaminodiphenyl methane and 192 g of trimellitic acid anhydride are then introduced, after which the reaction mixture is stirred for 2 hours at 190° C., for 2 hours at 200° C. and for 2 hours at 210° C., ultimately in vacuo. The polyester imide solidifies on cooling to form a clear brittle resin. A 15% by weight solution in cresol has a viscosity ($\eta_{25}$) of 140 mPas. A 20% by weight solution of the resin in cresol is applied to a glass plate and stoved, first at 200° C. and then at 300° C., to form a clear plastic lacquer film.

EXAMPLE 11

186 g of ethylene glycol and 117 g of tris-hydroxy ethyl triazolidine dione are initially introduced, followed by the addition at 120° C., commensurate with the exothermic reaction, of 200 g of 4,4'-diisocyanatodiphenyl methane. 383 g of trimellitic acid anhydride are then introduced, after which the reaction mixture is heated first to 160° C. and then to 210° C. over a period of 10 hours. The reaction product is a brown brittle resin. A 15% by weight solution in cresol has a viscosity ($\eta_{25}$) of 190 mPas.

A solution of equal parts of the thus-produced polyester imide resin, a polyester of terephthalic acid, glycerol and ethylene glycol and 1% by weight of titanium tetrabutylate as catalyst in cresol is applied to a metal plate and stoved, first at 200° C. and then at 300° C., to form a hard, elastic lacquer film.

EXAMPLE 12

186 g of ethylene glycol, 80 g of 4,4'-bis(methoxy carbonyl propyl amino)-diphenyl methane, 117 g of tris-hydroxy ethyl triazolidine dione and 0.2 g of triethylene diamine are initially introduced, followed by the introduction at from 40° to 50° C. of 250 g of 4,4'-diisocyanatodiphenyl methane. The mixture is then stirred for 1 hour at from 40° to 50° C. and subsequently heated to 120° C., followed by the addition of 384 g of trimellitic acid anhydride. The temperature of the reaction mixture is then raised to 210° C. over a period of 10 hours. The polyester imide hydantoin is obtained in the form of a brittle resin. A 15% by weight solution in cresol has a viscosity ($\eta_{25}$) of 120 mPas. A sample is dissolved in cresol with equal parts of a polyester of terephthalalic acid, ethylene glycol and glycerol and 1% by weight of titanium tetrabutylate as catalyst, applied to a metal plate and stoved, first at 200° C. and then at 300° C., to form a clear elastic lacquer film.

EXAMPLE 13

372 g of ethylene glycol, 92 g of glycerol and 155 g of tris-hydroxy ethyl triazolidine dione are initially introduced. 266 g of an isocyanate mixture obtained by the phosgenation of a condensation product of aniline and formaldehyde, 415 g of terephthalic acid, 422 g of trimellitic acid anhydride and 1 g of Pb acetate are then introduced at 120° C. The temperature is increased to 200° C. over a period of 12 hours, ultimately in vacuo. The polyester imide is obtained in the form of a brittle brown resin. A 15% by weight solution in cresol has a viscosity ($\eta_{25}$) of 120 mPas.

1.5% by weight of titanium tetrabutylate is added to a 25% by weight solution of the resin in cresol/xylene (4:1), after which the solution is applied to a 0.7 mm diameter copper wire in the above-described manner at a furnace temperature of 400° C. Testing of a lacquered wire (lacquering speed 11 meters per minute) in accordance with DIN 46 453 reveals an elasticity of 88%, a softening temperature of 320° C. and an abrasion value equivalent to 21 strokes.

EXAMPLE 14

381 g of terephthalic acid dimethyl ester, 117 g of tris-hydroxy ethyl triazolidine dione and 1.1 g of Pb acetate are heated to 170° C., commensurate with the elimination of methanol, and then stirred for 1 hour at that temperature. 248 g of ethylene glycol, 174 g of 2,4-tolylene diisocyanate, 46 g of glycerol and 442 g of trimellitic acid anhydride are then added and the temperature raised to 210° C. over a period of 12 hours. The polyester imide solidifies on cooling to form a clear brittle resin. A 15% by weight solution in cresol has a viscosity ($\eta_{25}$) of 100 mPas. A lacquer solution is prepared from 300 g of this resin, 400 g of phenol/cresol (1:1), 200 g of a 25% by weight solution of a polyhydantoin in cresol ("Resistherm PH 20"), 4.5 g of titanium tetrabutylate and 100 g of xylene. A 0.7 mm diameter copper wire is lacquered using this solution in the above-described manner at a furnace temperature of 400° C. Testing of the lacquered wire (lacquering speed 11 meters per minute) in accordance with DIN 46 453 reveals an elasticity of 88%, a softening temperature of more than 320° C. and a heat shock of 260° C.

We claim:

1. Cross-linked polymers which are linked by ester and/or urethane groups and which optionally contain amide and/or imide groups and/or isocyanurate and/or hydantoin rings in co-condensed form or are mixed with the corresponding polymers, wherein said cross-linking component is derived from N,N',N''-tris-hydroxyalkyl triazolidine-3,5-diones corresponding to the following general formula:

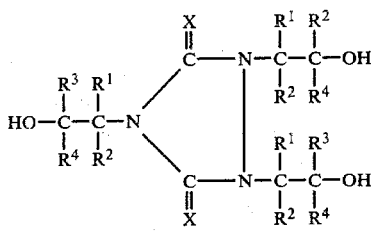

wherein
$R^1$, $R^2$, $R^3$ and $R^4$ each independently represents hydrogen, an optionally substituted aliphatic, cycloaliphatic or atomatic radical and X represents O or S.

2. Polymers as claimed in claim 1, wherein in the general formula $R^1$, $R^2$, $R^3$ and $R^4$ the same or different represent hydrogen, optionally halogen-substituted $C_1$–$C_{10}$ alkyl radical, $C_4$–$C_8$ cycloalkyl radical, $C_7$–$C_{17}$ aralkyl radical or a $C_6$–$C_{16}$ aryl radical optionally substituted by halogen, $C_1$–$C_6$ alkyl and/or $C_1$–$C_6$ alkoxy.

3. Solutions or mixtures containing the polymers claimed in claim 1 as binders.

4. Heat-resistant coating materials, films, powders, adhesives or shaped articles obtained from solutions or mixtures as claimed in claim 3.

5. Lacquers, particularly wire lacquers obtained from solutions or mixtures as claimed in claim 3.

* * * * *